(12) United States Patent
Harris et al.

(10) Patent No.: US 7,398,096 B2
(45) Date of Patent: Jul. 8, 2008

(54) SYSTEM AND METHOD FOR DELAY REDUCTION VIA AUTOMATIC TARGET PACKET TRANSMISSION

(75) Inventors: John M. Harris, Chicago, IL (US); Ronald T. Crocker, St. Charles, IL (US); James A. Marocchi, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 185 days.

(21) Appl. No.: 11/004,067

(22) Filed: Dec. 3, 2004

(65) Prior Publication Data

US 2006/0121888 A1 Jun. 8, 2006

(51) Int. Cl.
*H04Q 7/20* (2006.01)

(52) U.S. Cl. ...................................... 455/518; 455/519

(58) Field of Classification Search ............... 455/414.1, 455/416, 518, 450, 509, 507, 519, 90.2
See application file for complete search history.

(56) References Cited

U.S. PATENT DOCUMENTS

| | | | |
|---|---|---|---|
| 6,449,491 B1 * | 9/2002 | Dailey | 455/518 |
| 6,748,231 B2 * | 6/2004 | Pan et al. | 455/518 |
| 2003/0190926 A1 | 10/2003 | Harris et al. | |
| 2003/0207690 A1 | 11/2003 | Dorenbosch | |
| 2004/0008680 A1 * | 1/2004 | Moss et al. | 370/390 |
| 2004/0187109 A1 * | 9/2004 | Ross et al. | 718/100 |
| 2004/0219940 A1 * | 11/2004 | Kong et al. | 455/518 |
| 2005/0009548 A1 * | 1/2005 | Kelley et al. | 455/509 |
| 2005/0164682 A1 * | 7/2005 | Jenkins et al. | 455/412.1 |
| 2005/0255871 A1 * | 11/2005 | Saeed et al. | 455/518 |
| 2006/0046758 A1 * | 3/2006 | Emami-Nouri et al. | 455/518 |
| 2006/0111134 A1 * | 5/2006 | Mills | 455/518 |
| 2006/0116149 A1 * | 6/2006 | Dunn et al. | 455/518 |

* cited by examiner

*Primary Examiner*—Nick Corsaro
*Assistant Examiner*—Shannon R Brooks

(57) ABSTRACT

A system and method for establishing communication with a target mobile station (312) initiated in part by establishment of a traffic communication channel with a target mobile station (312). Responsive to establishing the traffic communication channel, a message is sent by the target mobile station (312) substantially immediately to a dispatch server (304) via the traffic communication channel. The message comprises information indicating acceptance of a push-to-talk (PTT) request.

5 Claims, 4 Drawing Sheets

SYSTEM AND METHOD FOR DELAY REDUCTION VIA AUTOMATIC TARGET PACKET TRANSMISSION

FIELD OF THE INVENTION

The invention relates to establishing communications in networks. More specifically, it relates to providing for the efficient transmission of communications within these networks.

BACKGROUND OF THE INVENTION

In many push-to-talk (PTT) systems, an originating mobile station typically sends a Session Initiation Protocol (SIP) INVITE message over a communication channel to initiate the establishment of voice communications with a target mobile station. This SIP INVITE message causes a dispatch server in the network to page the target mobile station. The target mobile station then responds to the page and obtains a dedicated data traffic channel to communicate with the originating mobile station.

In these previous systems, after the data traffic channel is established, the target mobile station typically waits until it receives the SIP INVITE message from the server before returning a 200 OK message to the dispatch server. Then, a talk permit tone (TPT) is sent to the originating mobile station from the dispatch server to initiate the actual voice transmission over a voice communication channel. Once the TPT has been received at the originating mobile station the speaker begins speaking, the voice communication channel can be established between the originating mobile station and the target mobile station and voice communications can occur.

The approaches used in previous systems result in significant delays in establishing voice communications between mobile stations in a network. For instance, delays occur because of the transmission of the SIP INVITE message to the target mobile station. Processing time is also required at the target mobile station to process the SIP INVITE message. An Automatic Repeat Request (ARQ) such as that incurred by Radio Link Protocol (RLP), Radio Lick Control (RLC), or Hybrid ARQ (HARQ) round-trip-delay also exists. Additional delays occur since the target is required to generate the 200 OK message and to transmit this message to the originating mobile station. If SIP compression is used, the delays can be still longer as time is required to perform compression and/or decompression on the various messages. All of these factors lead to a degradation of system performance and a potentially unpleasant user experience due to the delays.

Figure 1:
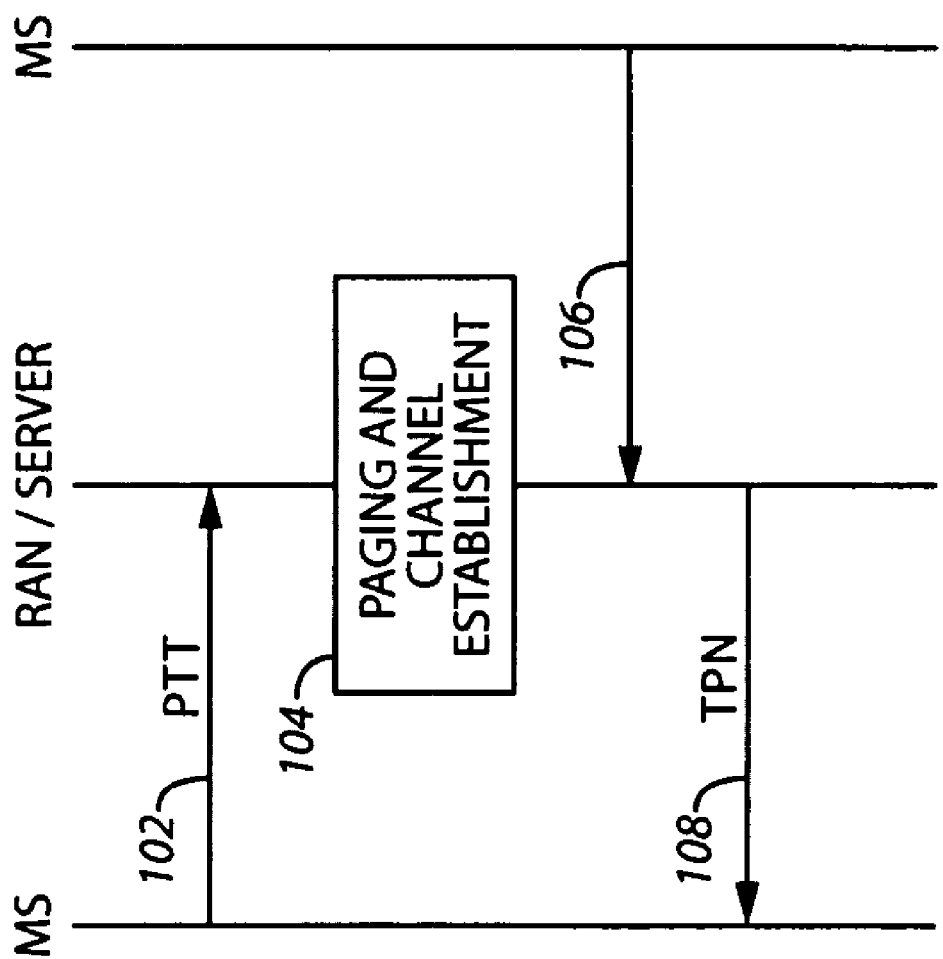
FIG. 1 is a flowchart of one example of an approach for reducing delays in the establishment of voice communications in a network according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method allows for the reduction of delays in the delivery of messages across a network. In this regard, an acceptance message, for instance, a short OK message, is sent from a target mobile station to a dispatch server immediately after it is determined that the target mobile station has been newly established on a data traffic channel. Once the short OK message is received at the dispatch server, the dispatch server sends a talk permit tone (TPT) to the originating mobile station and voice communications can occur between the originating mobile station and the target mobile station. Significant time savings in establishing a connection between the originating mobile station and the target mobile station is achieved using this approach. Consequently, system performance and efficiency are enhanced.

In many of these embodiments, communications with a target mobile station are established by a user initiating a push-to-talk (PTT) request at an originating mobile station. A data traffic communication channel is established with the target mobile station. Responsive to the establishment of the data traffic communication channel, a message is sent substantially immediately from the target mobile station to a dispatch server via the traffic communication channel. The message comprises information indicating acceptance of the push-to-talk (PTT) request from the originating mobile station.

The message is received at the dispatch server. The dispatch server responsively transmits an indication, such as a TPT, to the originating mobile station to begin the voice communication.

In some of these embodiments, a reverse channel load may be determined and the message may be sent when the reverse channel load is below a threshold. In addition, a channel type for the traffic communication channel may be identified and the message may be sent when the channel type is a PTT channel type.

The present approach results in increased time savings in the transmission of messages in the network. For example, the delays that occur because of the transmission of the SIP INVITE messages are eliminated. Processing time is also reduced since certain messages (e.g., SIP INVITE messages) are no longer processed at the target mobile station. The experience of customers using the system is enhanced because of the faster establishment of voice communications.

Referring now to FIG. 1, one example of an approach for reducing the time to establish communications in a network is described. At step 102, a push-to-talk (PTT) request is sent from an originating mobile station to a server in a radio network. The PTT request indicates that the user wants to establish voice communications with another user at a target mobile station. At step 104, paging and channel establishment operations are performed at the Radio Access Network (RAN) by the server. For example, the server may attempt to establish a traffic channel to facilitate the voice communications. In addition, the server may attempt to page the target mobile station and receive communications from the target mobile station indicating that the target mobile station has been located. At the completion of step 104, the target mobile station is connected to a data traffic channel.

If the target mobile station detects that it is newly on the data channel at step 106, the mobile station transmits a short acknowledgment message, for example, a short OK message, to the dispatch server. The target mobile station detects that it is on a data channel by providing a data channel indication to the PTT application as a result of a confirmed channel establishment message to the RAN.

The determination as to whether to send the message may also include an analysis of the strength of the Radio Frequency (RF) cost/load environment. This can be made by testing the RF load/pilot signal strength and the number of Walsh codes available. In addition, a determination may be made as to whether the mobile station is inactive. A determination may also be made to decide whether the target mobile station did not send a short data burst (SDB) message.

Besides identifying the target mobile station, the short OK message may include other information. For example, the short OK message may include information limiting the transmission of the message to certain preferred dispatch buddies.

After receiving the short OK message, the dispatch server sends a talk-permit-tone (TPT) to the originating mobile station at step 108. The TPT is used by the originating mobile unit and the network to establish a voice communication channel with the target mobile station.

The approaches described herein result in substantial time savings in call establishment and the subsequent reduction in transmission delays. For example, by triggering on the traffic channel assignment complete trigger, the processing time is reduced since the SIP INVITE message does not have to be transmitted to or processed at the target mobile station prior to transmitting a message from the target to trigger the talk permit tone. A 200 OK message also does not have to be transmitted from the target mobile station. Because of the reduction of delays, the user experience is enhanced.

Figure 2:
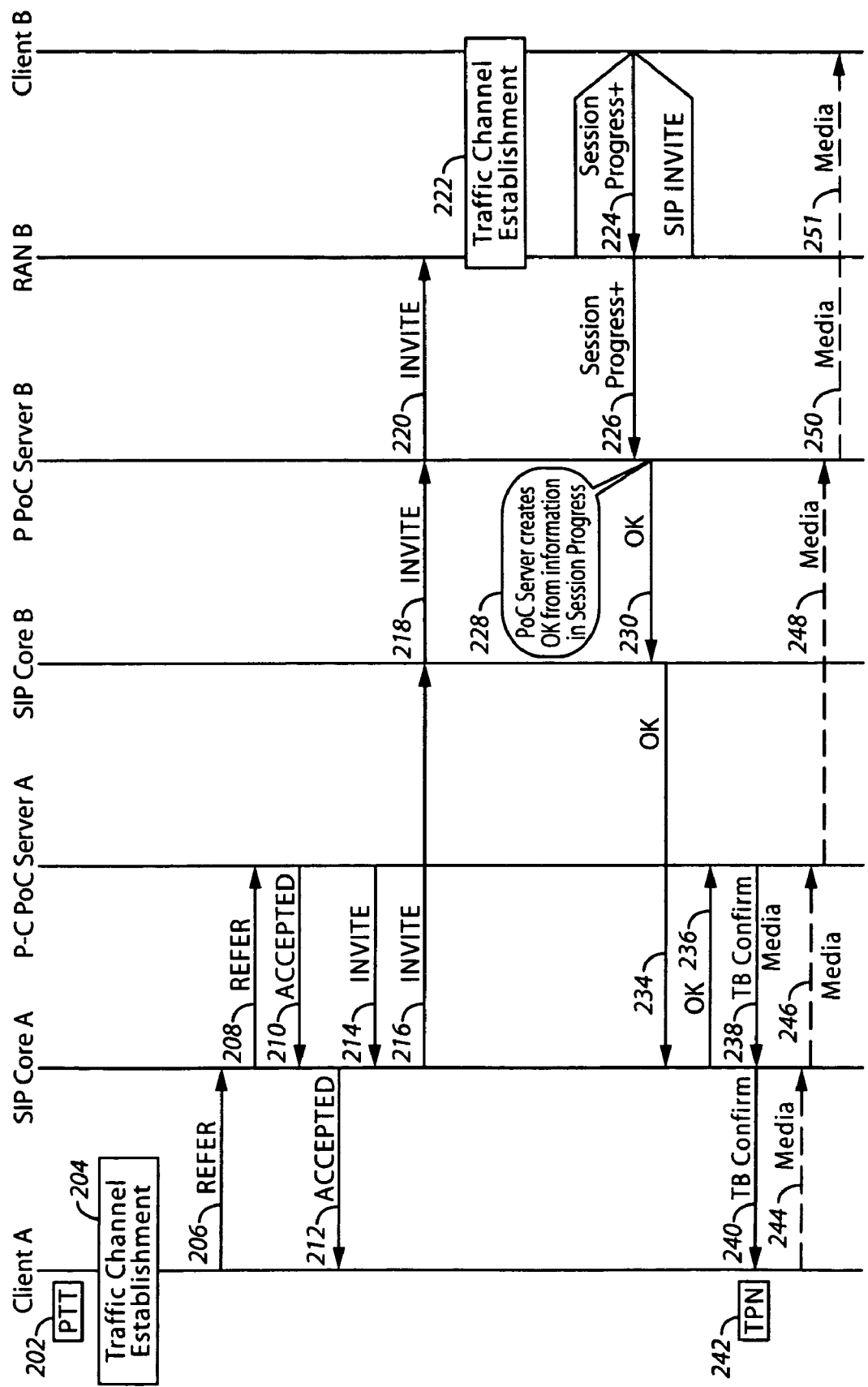
FIG. 2 is a flowchart of another example of an approach for reducing delays in establishment of voice communications in a network according to the present invention.

Referring now to FIG. 2, another example of an approach for establishing communications between an originating mobile station and a destination mobile station is described. At step 202, a push-to-talk (PTT) request is made from an originating mobile station. At step 206, a refer message is sent from the originating mobile station to a first SIP core, which may include a first radio access network (RAN). At step 208, the message is sent to a first server, which may be a controlling server.

At step 210, the first (controlling) server determines whether to accept the refer message and sends an accept message to the first SIP core. At step 212, the accept message is returned to the originating mobile station.

At step 214, an INVITE message is sent from the first (controlling) server to the SIP core. At step 216, the INVITE message is sent from the first SIP core to the second SIP core. At step 218, the INVITE message is sent from the second SIP core to a second server, for instance, a participating server. At step 220, the INVITE message is sent from the second (participating) server to a Radio Access Network (RAN).

At step 222, traffic channel establishment occurs between the second RAN and the target mobile station. At step 224, a session progress message is sent from the target mobile station to the second RAN. At step 226, the session progress message is sent from the second RAN to the second (participating) server. At step 228, the second (participating) server creates a short OK message by correlating the session information in the original INVITE (step 218) with the information received in the short OK from the target mobile station. At step 230, the newly created OK message is sent from the second (participating) server to the second SIP core. At step 234, the OK message is sent from the second SIP core to the first SIP core.

At step 236, the OK message is sent from the first SIP core to the first (controlling) server indicating the establishment of the traffic channel to the first (controlling) server. At step 238, a Talk Burst (TB) confirm is sent from the first (controlling) server to the first SIP core. At step 240, the TB confirm is sent from the SIP core to the originating mobile station as an indication that the mobile station can provide a talk permit indication to the user. At step 242, the talk permit notification is received at the originating mobile station.

At step 244, a media link is established between the originating mobile station and the SIP core. At step 246, the media link is established between the first SIP core and the first (controlling) server. At step 248, the media link is established between the first (controlling) server and the second server. At step 250, the media link is established between the second (participating) server and the second RAN. At step 251, the media link is established between the second RAN and the target mobile station.

Figure 3:
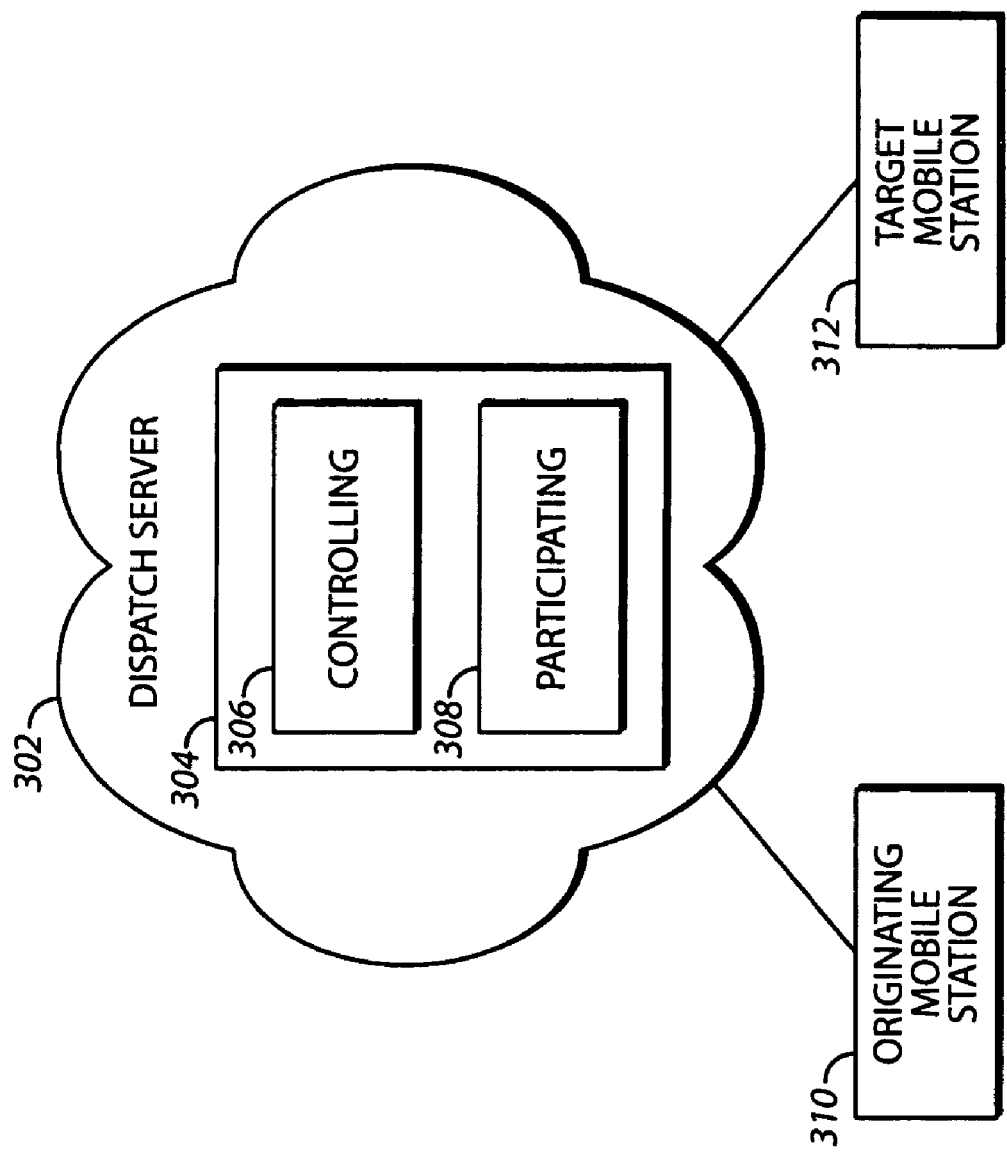
FIG. 3 is a block diagram of a system for reducing delays in establishing voice communications in a network according to the present invention.

Referring now to FIG. 3, one example of a system for reducing delays in the establishment of communications between an originating mobile station 310 and a target mobile station 312 is described. The mobile stations may be any type of mobile wireless communication device such as pagers, cellular telephones, or personal digital assistants (PDAs). Other examples of mobile stations are possible.

A network 302 allows communications between the originating mobile station and the target mobile station 312. The network 302 can be a series of networks having different servers, cores, and switches that allow a communication path to be established between the originating mobile station 310 and 312. A dispatch server 304 is included in the network 302. The dispatch server may be comprised of both a controlling server 306 and a participating server 308.

In operation, a communication session is established between the originating mobile station 310 and the target mobile station 312. Once the target mobile station detects the establishment, the target mobile station transmits a short OK message to the dispatch server 304. As a result, the dispatch server transmits a talk permit tone (TPT) to the originating mobile station. Thereafter, the dispatch call between the originating mobile station and the target mobile station is established.

Figure 4:
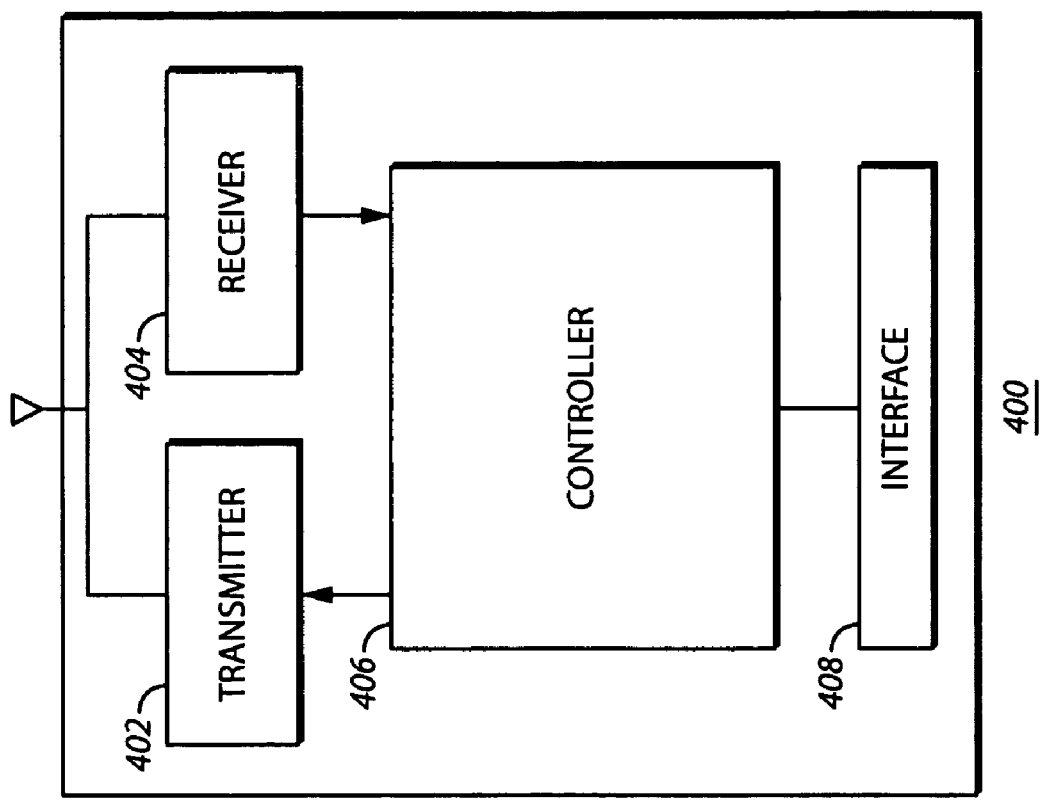
FIG. 4 is a block diagram of a mobile station used for reducing delays in the establishment of voice communications in a network according to the present invention.

Referring now to FIG. 4, one example of a mobile station 400 for sending messages in a network is described. A receiver 404 receives a push-to-talk (PTT) request over the antenna 401. A transmitter 402 is also coupled to the antenna.

A controller 406 is coupled to the receiver 404 and the transmitter 402. The controller 406 is programmed to determine an establishment of a data traffic communication channel that was completed as a result of receiving the PTT request. The controller 406 is further programmed to substantially immediately send a short acknowledgment message to a dispatch server via the transmitter 402 and antenna 401 after determining the completion of channel establishment. The short acknowledgment message includes information indicating the acceptance of the push-to-talk (PTT) request made over the data traffic communication channel.

A user interface 408 is coupled to the controller 406 and includes all controls and functionality needed for a user to utilize the mobile station 400. For example, the interface may include a keypad, microphone, liquid crystal display (LCD), or other devices that all a user to utilize the mobile device 400.

The present approach results in increased time savings in the transmission of messages in the network. For example, delays occurring because of the transmission of the SIP INVITE messages are eliminated. Processing time is also reduced since certain messages such as SIP INVITE messages are no longer processed. The experience of customers using the system is also enhanced.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A mobile station comprising:
    a receiver having an input, the input receiving a push-to-talk (PTT) request;
    a transmitter having an output; and
    a controller coupled to the receiver and the transmitter, the controller programmed to determine an establishment of a traffic communication channel completed as a result of receiving the PTT request at the input of the receiver, the controller further programmed to substantially immediately send a short acknowledgment message to a dispatch server on the output of the transmitter after determining the completion of channel establishment and prior to receiving a SIP INVITE message, the short acknowledgment message comprising information indicating an acceptance of the push-to-talk (PTT) request made over the traffic communication channel.

2. The mobile station of claim 1 wherein the controller further receives a special indication message at the input of the receiver, the special indication message comprising information enabling the sending of the short acknowledgment message.

3. The mobile station of claim 1 wherein the controller further comprises means for aborting the sending of the short acknowledgment message when a non-dispatch Non-INVITE communication is detectably received at the input of the receiver.

4. A system for exchanging messages between devices comprising:
    a dispatch server arranged and configured to send a PTT request;
    a source mobile station having and input and output and communicatively coupled to the dispatch server, the source mobile sending a PTT request at the output, and configured to receive a talk permit notification from the dispatch server;
    a target mobile station having an input and output and communicatively coupled to the dispatch server, the target mobile station receiving the PTT request at the input and determining an establishment of a traffic channel after receiving the PTT request, the target mobile unit further programmed to substantially immediately send a short acknowledgment message to the dispatch server on the output when the establishment completion is determined and prior to receiving a SIP INVITE message, the short acknowledgment message comprising information indicating an acceptance of the PTT request.

5. The system of claim 4 wherein the dispatch sewer comprises a controlling server and a participating server.

* * * * *